(12) United States Patent
Puvvada et al.

(10) Patent No.: US 10,938,892 B1
(45) Date of Patent: Mar. 2, 2021

(54) INTER-CLUSTER DATA TRANSFER BETWEEN FILE SYSTEMS

(71) Applicant: International Business Machines Corporation, Armonk, NY (US)

(72) Inventors: Venkateswara Rao Puvvada, Inkollu (IN); Karrthik K G, Kodaikanal (IN); Saket Kumar, Bettiah (IN); Ashish Pandey, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/744,032

(22) Filed: Jan. 15, 2020

(51) Int. Cl.
*H04L 29/08* (2006.01)
*G06F 11/14* (2006.01)
*H04L 29/06* (2006.01)

(52) U.S. Cl.
CPC ...... *H04L 67/1008* (2013.01); *G06F 11/1464* (2013.01); *H04L 67/42* (2013.01)

(58) Field of Classification Search
CPC ... H04L 67/1008; H04L 67/42; G06F 11/1464
USPC ....................................................... 709/220
See application file for complete search history.

(56) References Cited

U.S. PATENT DOCUMENTS

| 9,992,274 | B2 | 6/2018 | Gunda et al. |
| 2017/0139910 | A1 | 5/2017 | Mcalister et al. |
| 2018/0196817 | A1* | 7/2018 | Maybee ................. G06F 3/0641 |
| 2018/0196832 | A1* | 7/2018 | Maybee ................. G06F 16/434 |
| 2018/0217888 | A1* | 8/2018 | Colgrove .............. G06F 11/076 |
| 2019/0159077 | A1 | 5/2019 | Ryu et al. |
| 2019/0281113 | A1 | 9/2019 | Preston et al. |
| 2019/0340075 | A1* | 11/2019 | Ramachandran ... G06F 11/1451 |
| 2020/0073567 | A1* | 3/2020 | Kondapalli ........... G06F 3/0665 |
| 2020/0125454 | A1* | 4/2020 | Naidu ................. G06F 11/2033 |

OTHER PUBLICATIONS

Fahs et al., "Proximity-Aware Traffic Routing in Distributed Fog Computing Platforms," IEEE/ACM International Symposium in Cluster, Cloud, and Grid Computing, May 2019, 11 pages.

* cited by examiner

*Primary Examiner* — Frantz B Jean
(74) *Attorney, Agent, or Firm* — Zilka-Kotab, P.C.

(57) ABSTRACT

A computer-implemented method according to one embodiment includes receiving, on a first gateway node of a first cluster site, an input/output (I/O) request for a first fileset, and determining a collection of mount operations in which to add the I/O request for the first fileset. The determining includes hashing information of the first fileset against more than one collection of mount operations. The method further includes adding the I/O request for the first fileset to a first determined collection of mount operations, and outputting the first determined collection of mount operations to a first network file system (NFS) server. The first NFS server is one of a plurality of NFS servers of a second cluster site. Moreover, the first NFS server and at least one other NFS server of the plurality of NFS servers are configured to receive a collection of mount operations from the first gateway node.

20 Claims, 8 Drawing Sheets

INTER-CLUSTER DATA TRANSFER BETWEEN FILE SYSTEMS

BACKGROUND

The present invention relates to clustered file system environments, and more specifically, this invention relates to data transfer between file systems of a first cluster site and a second cluster site according to collections of mount operations, to enable disaster recovery (DR), backup, and/or migration solutions having relatively high efficiencies and throughput.

File systems may exist and be shared at more than one physical location where the file system is mounted on multiple servers. One specific type of such a shared file system includes a clustered file system. Clustered file systems are often used to store redundant copies of data, and enable use of different servers to access a common file at the same time. For example, a first copy of an instance of data may be stored on a local cluster site, and a second copy of the instance of data may be stored on a remote cluster site.

SUMMARY

A computer-implemented method according to one embodiment includes receiving, on a first gateway node of a first cluster site, an input/output (I/O) request for a first fileset, and determining a collection of mount operations in which to add the I/O request for the first fileset. The determining includes hashing information of the first fileset against more than one collection of mount operations. The method further includes adding the I/O request for the first fileset to a first determined collection of mount operations, and outputting the first determined collection of mount operations to a first network file system (NFS) server. The first NFS server is one of a plurality of NFS servers of a second cluster site. Moreover, the first NFS server and at least one other NFS server of the plurality of NFS servers are configured to receive a collection of mount operations from the first gateway node.

A computer program product for data transfer between file systems of a first cluster site and a second cluster site according to collections of mount operations, to enable disaster recovery (DR)/backup/migration solutions having relatively high efficiencies/throughput according to another embodiment includes a computer readable storage medium having program instructions embodied therewith. The program instructions are readable and/or executable by a controller to cause the controller to perform the foregoing method.

A system according to another embodiment includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
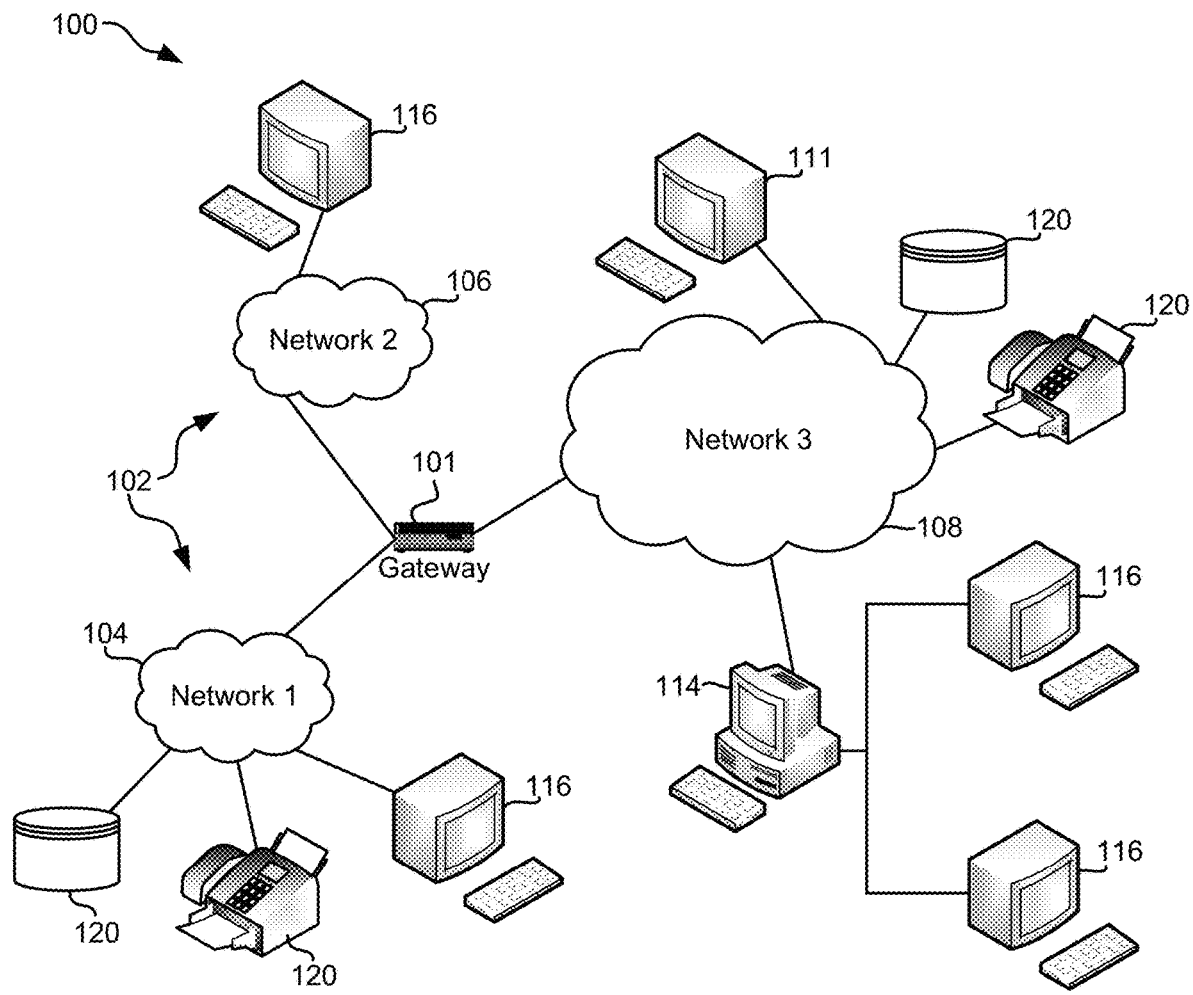
FIG. 1 is a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for data transfer between file systems of a first cluster site and a second cluster site according to collections of mount operations, to enable disaster recovery (DR), backup, and/or migration solutions having relatively high efficiencies and throughput.

In one general embodiment, a computer-implemented method includes receiving, on a first gateway node of a first cluster site, an input/output (I/O) request for a first fileset, and determining a collection of mount operations in which to add the I/O request for the first fileset. The determining includes hashing information of the first fileset against more than one collection of mount operations. The method further includes adding the I/O request for the first fileset to a first determined collection of mount operations, and outputting the first determined collection of mount operations to a first network file system (NFS) server. The first NFS server is one of a plurality of NFS servers of a second cluster site. Moreover, the first NFS server and at least one other NFS server of the plurality of NFS servers are configured to receive a collection of mount operations from the first gateway node.

In another general embodiment, a computer program product for data transfer between file systems of a first cluster site and a second cluster site according to collections of mount operations, to enable disaster recovery (DR)/backup/migration solutions having relatively high efficiencies/throughput includes a computer readable storage medium having program instructions embodied therewith.

The program instructions are readable and/or executable by a controller to cause the controller to perform the foregoing method.

In another general embodiment, a system includes a processor, and logic integrated with the processor, executable by the processor, or integrated with and executable by the processor. The logic is configured to perform the foregoing method.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment, a UNIX® system which virtually hosts a Microsoft® Windows® environment, a Microsoft® Windows® system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
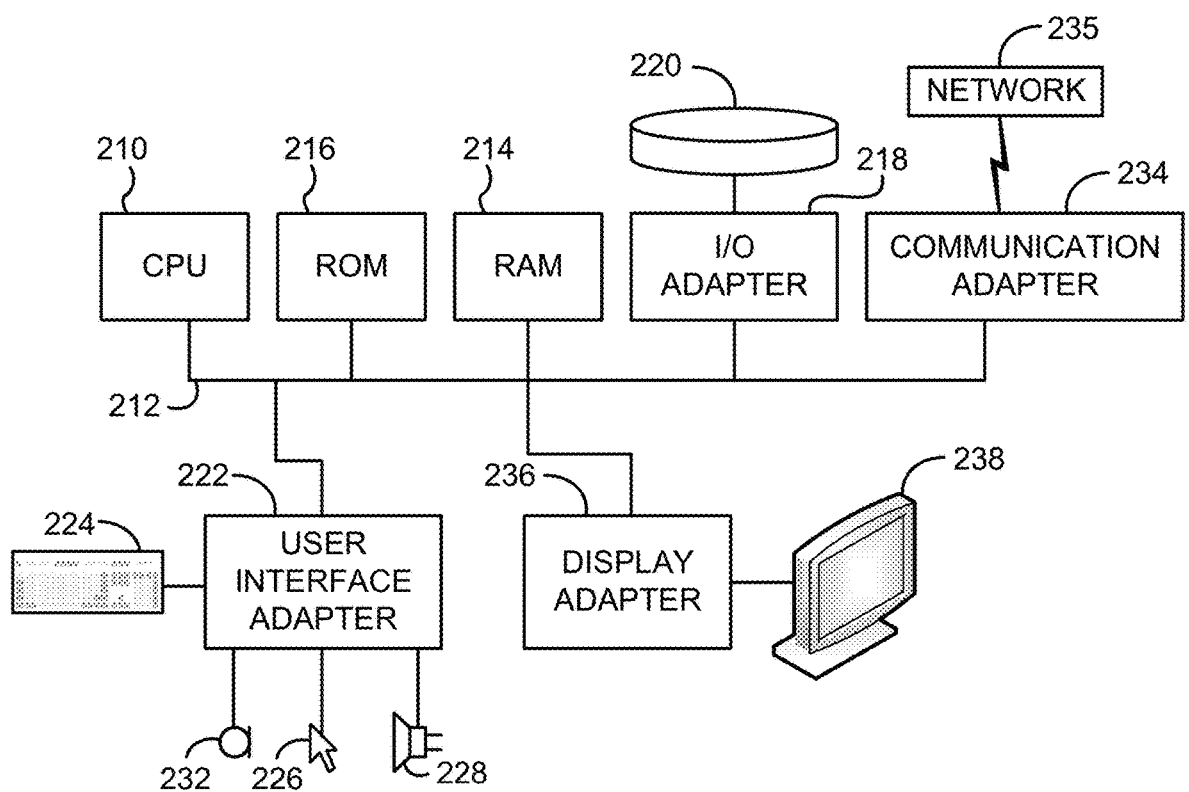
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
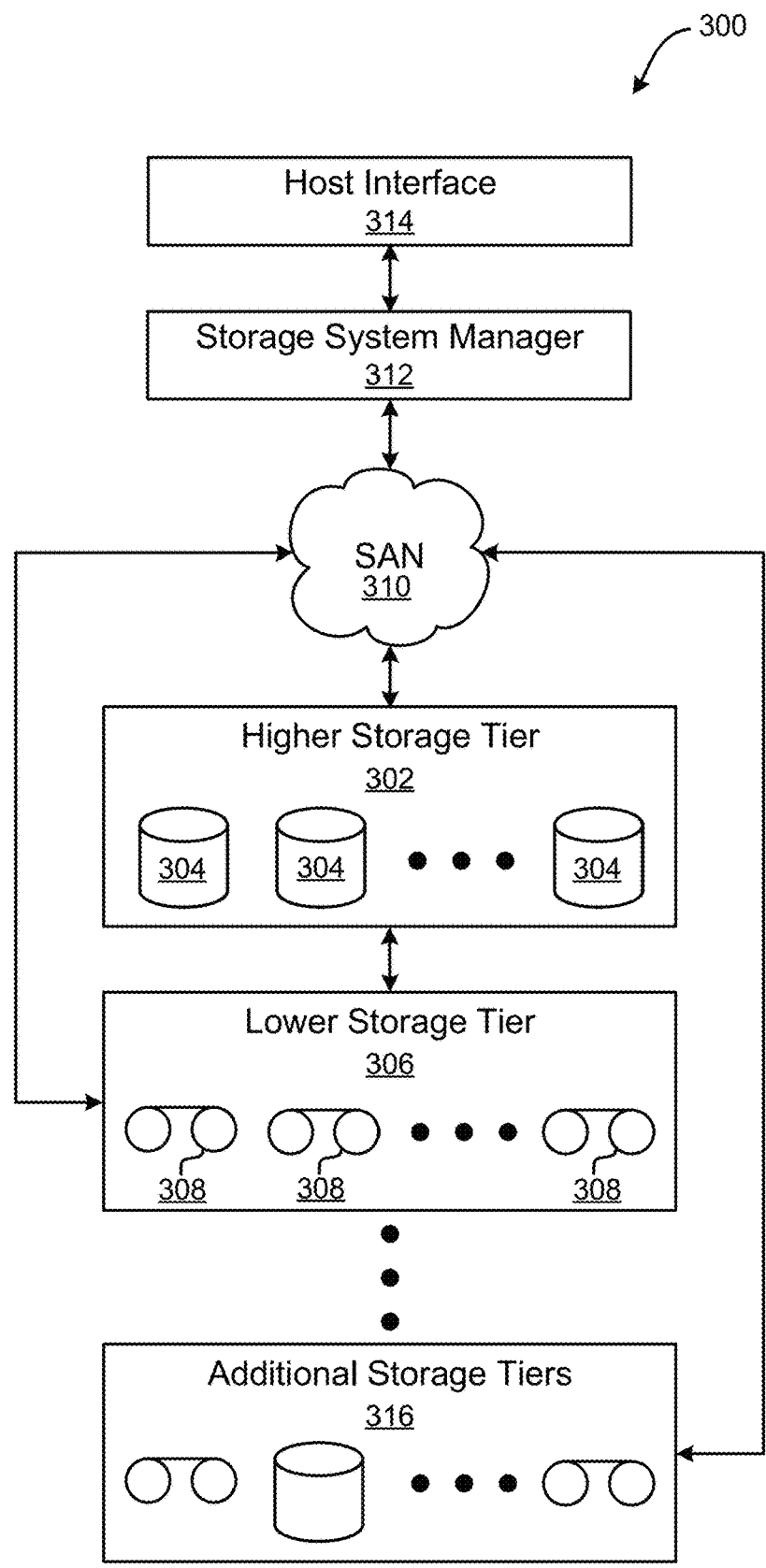
FIG. 3 is a tiered data storage system, in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As mentioned elsewhere herein, file systems may be shared/exist at more than one physical location where the file system is mounted on multiple servers. One specific type of such a shared file system includes a clustered file system. Clustered file systems are often used to store redundant copies of data, and enable use of different servers to access a common file at the same time.

Figure 4:
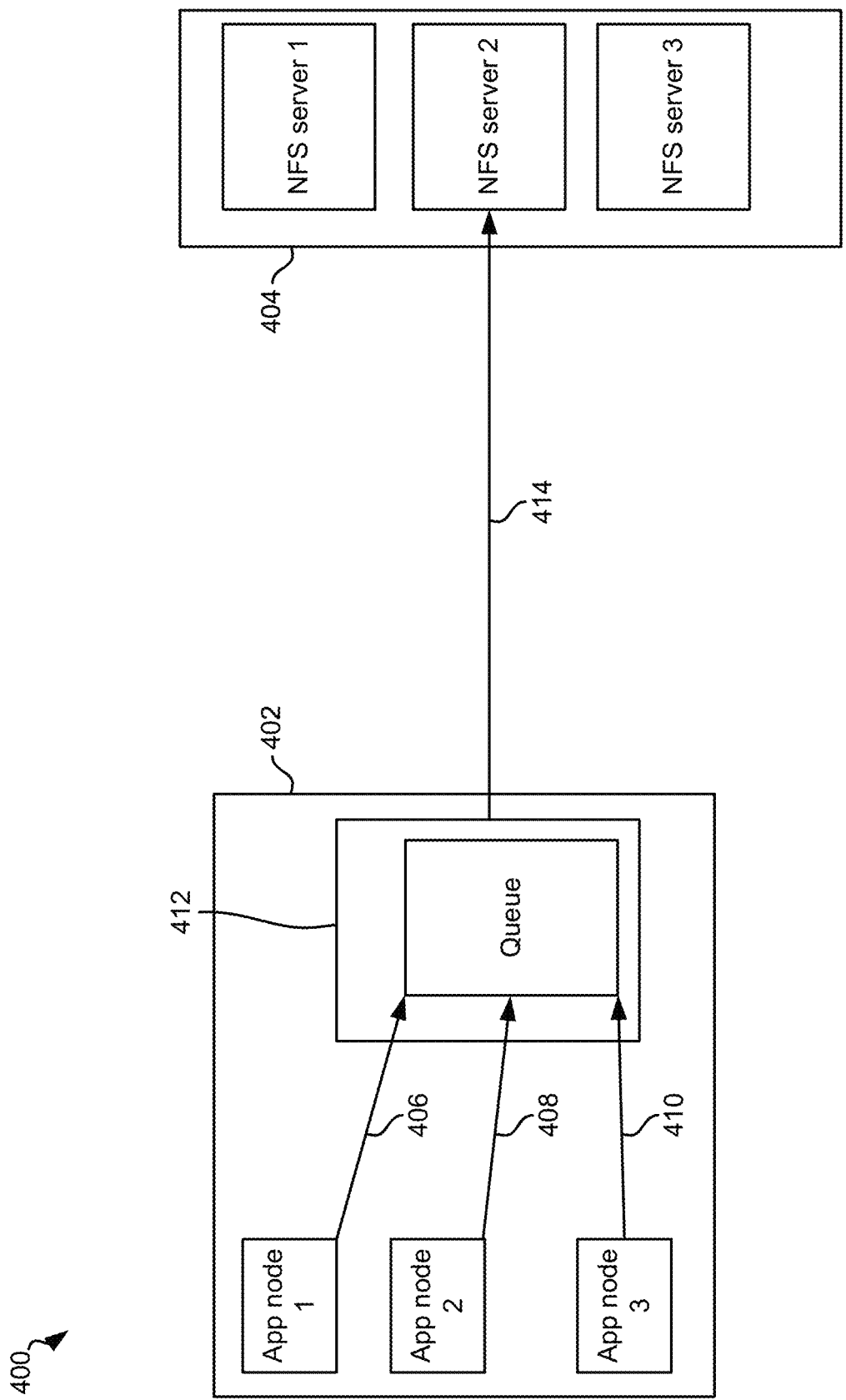
FIG. 4 is a clustered file system environment, in accordance with one embodiment.

Some data storage environments may include plurality of cluster sites. Referring now to FIG. 4, clustered file system environment 400 includes a first cluster 402, e.g., a primary cluster, a local cluster, a production site cluster, etc., and a second cluster 404, e.g., a remote cluster, a DR site cluster, a cluster used as a migration/backup destination, etc. In some approaches, some clusters of a clustered file system environment may be provisioned with relatively more hardware capabilities than other clusters of the clustered file system environment. For example, in one approach the first cluster 402 may be a production site that is provisioned with relatively greater hardware capabilities than the second cluster 404 which may be a remote site. The configuration of such an approach may be constructed in anticipation that an application load generated within the second cluster 404 will be less than an application load generated within the first cluster 402, e.g., see application nodes App node 1-App node 3 of the second cluster 404. However, in some approaches, the second cluster 404 may have a storage capacity that is about equal to the storage capacity of the first cluster 402. In the current embodiment, the second cluster 404 moreover includes a plurality of servers, e.g., see network file system (NFS) servers 1-3.

In the current configuration of the clustered file system environment 400, the single gateway node 412, which may also be designated as a metadata server, may be configured to consolidate all I/O requests that it receives from various application nodes. For example, gateway node 412 is shown receiving I/O requests 406, 408 and 410 from App nodes 1-3, in the first cluster 402, for a specific fileset for which the mentioned gateway node is designated as the metadata server. The gateway node 412 may maintain a queue of such asynchronous and synchronous operations that are to be executed to the remote second cluster 404, e.g., see Queue of the first cluster 402. Moreover, the gateway node 412 may consolidate the queue operations that are received at the gateway node 412 from the various application nodes in the first cluster 402.

As a result of NFS server 2 being configured to relay all I/O that has occurred on one or more filesets of the first cluster 402, NFS server 2 may become overloaded and/or experience bottlenecking which thereby results in underutilization of bandwidth between the first cluster 402 and the second cluster 404. More specifically, although there are multiple threads that may attempt to synchronize multiple requests from the first cluster 402 and the second cluster 404, because each of such requests have a common NFS virtual file system (VFS) layer destination, e.g., NFS server 2 via transmission arrow 414, the requests tend to experience a shortage of/delayed access to wire time. This results in slower than expected replication performance between the first cluster 402 and the second cluster 404, which may thereby also result in an inaccurate expectation of time for data to reach the second cluster 404.

Figure 5:
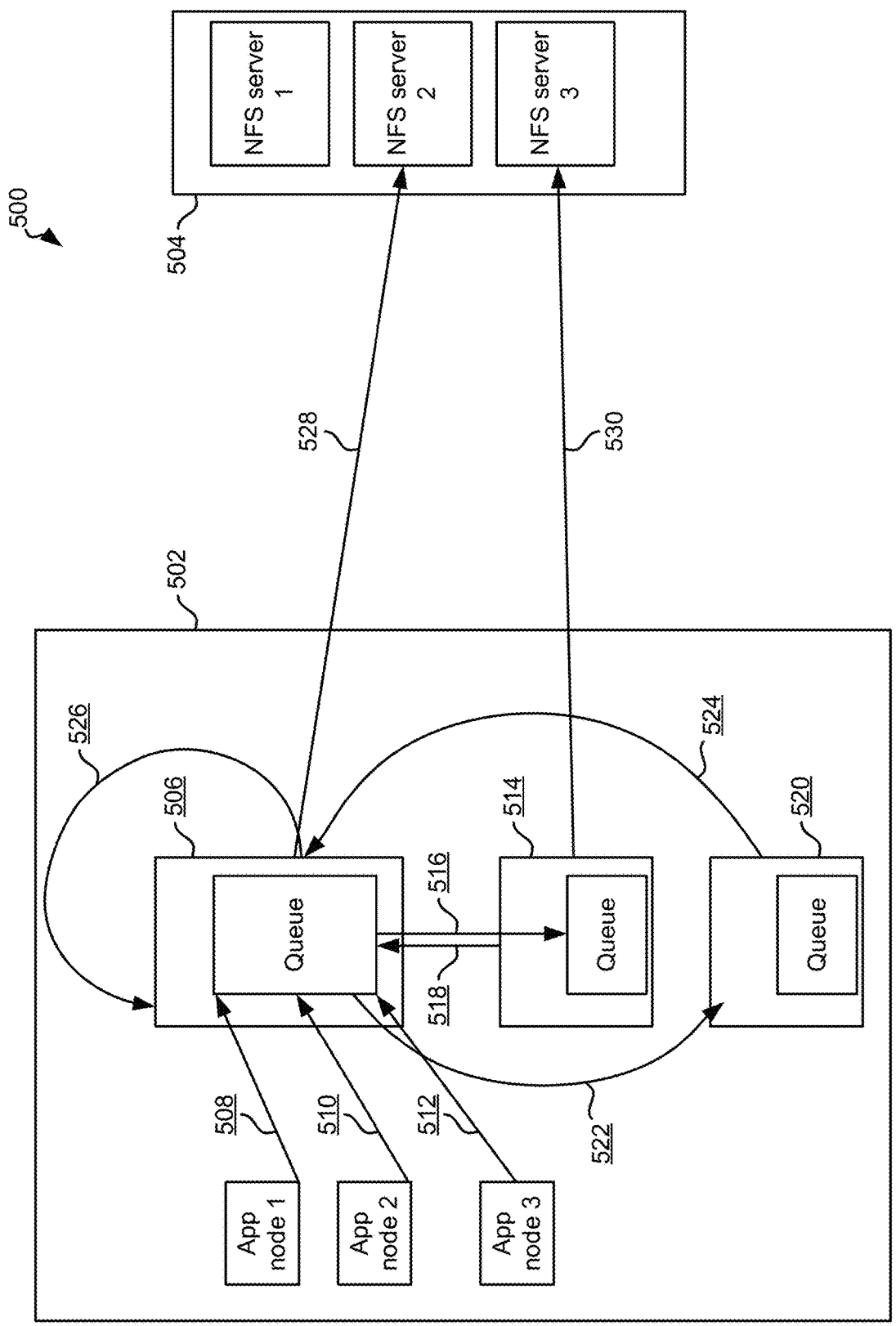
FIG. 5 is a clustered file system environment, in accordance with one embodiment.

Referring now to FIG. 5, clustered file system environment 500 includes a first cluster 502, and a second cluster 504. The first cluster 502 includes a primary gateway node 506, that is configured to receive I/O requests 508-512 from a plurality of application nodes, e.g., see App node 1, App node 2 and App node 3. The first cluster 502 is configured to process ACK failures of a received I/O request, e.g., by the first cluster 502 reassigning it to a helper gateway node or by the first cluster 502 retrying to replicate a request (see arrow 526).

The first cluster 502 furthermore includes a first helper gateway node 514 and a second helper gateway node 520, each of which are in communication with the primary gateway node 506. For example, in the current configuration, the primary gateway node 506 may be configured to utilize a known type of protocol call for sharing replication of an I/O chunk with the first helper gateway node 514, e.g., see arrow 516, and the first helper gateway node 514 may be configured to return an indication of success or failure occurring upon completion of processing the I/O chunk, e.g., see arrow 518. Similarly, in the current configuration, the primary gateway node 506 may be configured to utilize a known type of protocol call for sharing replication of an I/O chunk with the second helper gateway node 520, e.g., see arrow 522, and the second helper gateway node 520 may be configured to return an indication of success or failure occurring upon completion of processing the I/O chunk, e.g., see arrow 524.

Accordingly, in some implementations of the configuration of clustered file system environment 500, I/O may be split across multiple gateway nodes of the first cluster, and in turn data associated with such requests may be fetched or played to second cluster 504, e.g., see arrows 528, 530. More specifically, a master gateway or metadata server of a source/cache cluster (here represented by the first cluster 502) may communicate with the each of participating gateway node of the split I/O operation based on availability of such nodes. The single I/O request is then split into multiple chunks, which are sent or receive across all gateway nodes in parallel. For example, arrows 528, 530 may represent a special case where a relatively large I/O file is sent to different NFS servers by different gateway nodes, e.g., NFS server 2 receives a first chunk of the split I/O while NFS server 3 acts as a helper node by receiving a second of two chunks of the split I/O. However, splitting a single request across another gateway node, e.g., such as the first helper gateway node 514 and/or the second gateway node 520, and acknowledging responses between the collaborative gateway nodes thereafter may generate overhead which introduces delays in the process of fulfilling an I/O request, e.g., at least in part based on the coordination between NFS server nodes and helper NFS server nodes.

While the configuration of clustered file system environment 500 may offer efficiency for processing I/O requests corresponding to relatively large sized files based on a splitting of such files, processing I/O corresponding to files of a size that is smaller than such relatively large sized files introduces overhead. This is because all of the metadata operations and small sized data operations pass through the single metadata server subsequent being output by a gateway node. Moreover, relatively large sized data operations are split across other helper gateway nodes in the cluster in order to prevent the remote site NFS servers from becoming overburdened/clogged. Again, although the efficiency resulting from processing I/O requests corresponding to relatively large sized files using splitting and helper gateway nodes may offset some overhead, a considerable amount of overhead is experienced in achieving this parallelism. Inter gateway node procedural calls and/or failure detections may additionally and/or alternatively eliminate some potential performance gain in the current configuration.

On the other hand, the use of multiple helper gateway nodes to read/write from the underlying parallel file system in parallel does contribute to performance gain, e.g., boost local disk read performance. Moreover, using multiple helper gateway nodes to write/read parallelly to respective associated NFS servers provides a parallelism advantage at the remote site, e.g., the second cluster 504, where data is being backed up or fetched from.

The configuration of clustered file system environment 500 may also experience performance setbacks in response to any of the NFS servers failing. This is because split I/O requests become undeliverable where a transmitting gateway node attempts to output a split I/O request to a failed (non-functional) NFS server. In some approaches, detection of such a problem is delayed because failure of the NFS server (and thereby failure of delivery of the I/O request) may only become apparent in response to receiving a request to replay the split I/O request to the remote server. This marker indicates that the helper gateway may be bad, but again, determining whether non-functional components have regained functionality may involve communicating again through a costly protocol call between the gateway nodes. Also, in the current configuration of clustered file system environment 500, in the event that a gateway node targets a non-functional NFS server at the second cluster site 504, there is a complete halt of I/O, even though the other helper gateway nodes might be targeting a functional NFS server of the second cluster site 504. This is because each gateway node of the first cluster site is configured to perform outputting/receiving operations utilizing only one NFS server of the second cluster site 504. Accordingly, the gateway nodes of the first cluster site 502 depend on the functionality of an associated NFS server.

In contrast to several of the configurations of clustered file system environments described elsewhere above, e.g., see FIGS. 4-5, various embodiments and approaches described herein include utilizing collections of mount operations to transfer data between file systems of a first cluster site and a second cluster site to enable disaster recovery (DR)/backup/migration solutions having relatively high efficiencies/throughput. In such embodiments and approaches, more than one gateway node of the first cluster site is configured to receive I/O requests, and moreover one or more gateway nodes of the first cluster site are configured to output to more than one server of the second cluster.

Figure 6A:
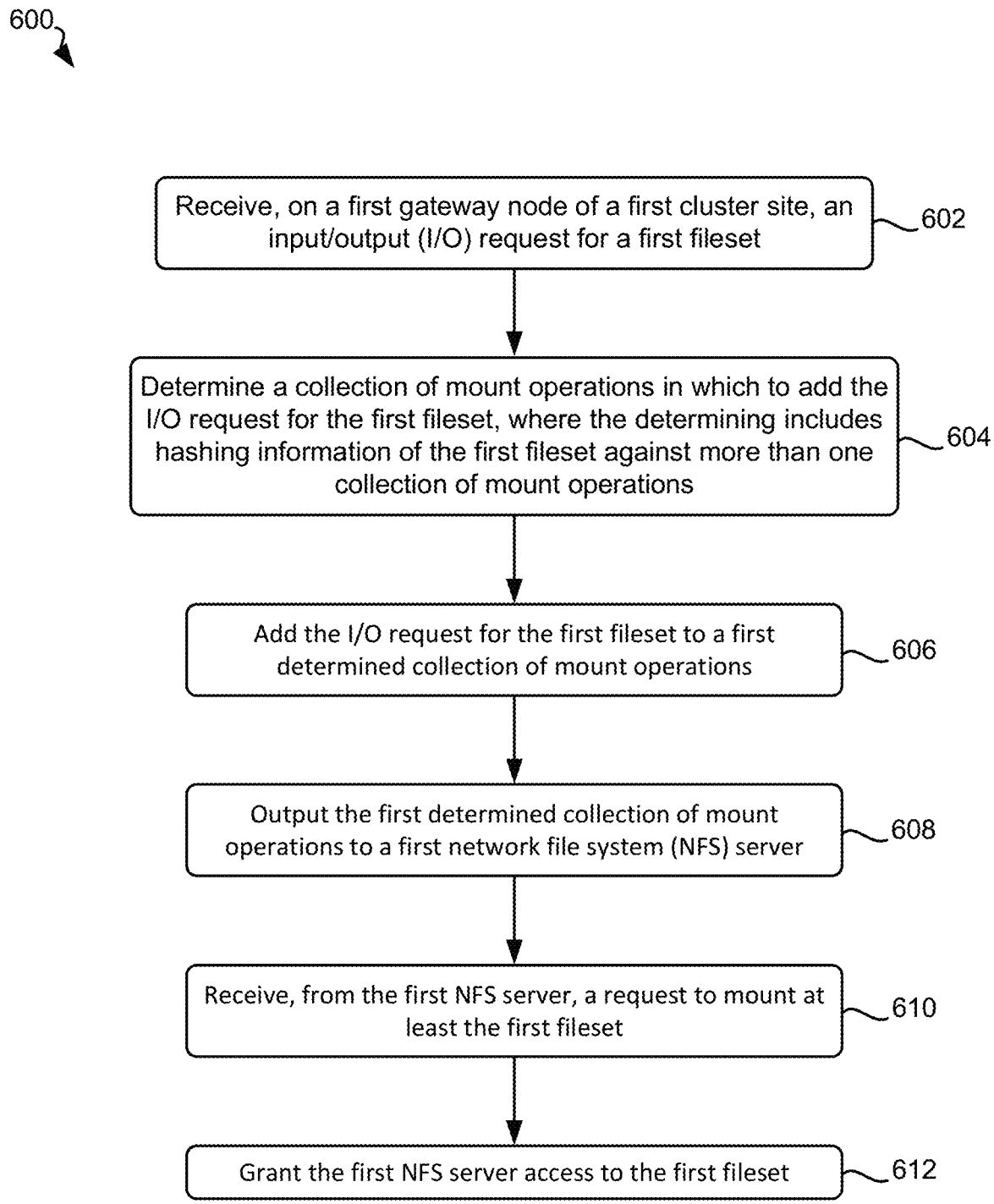
FIG. 6A is a flowchart of a method, in accordance with one embodiment.
Figure 6B:
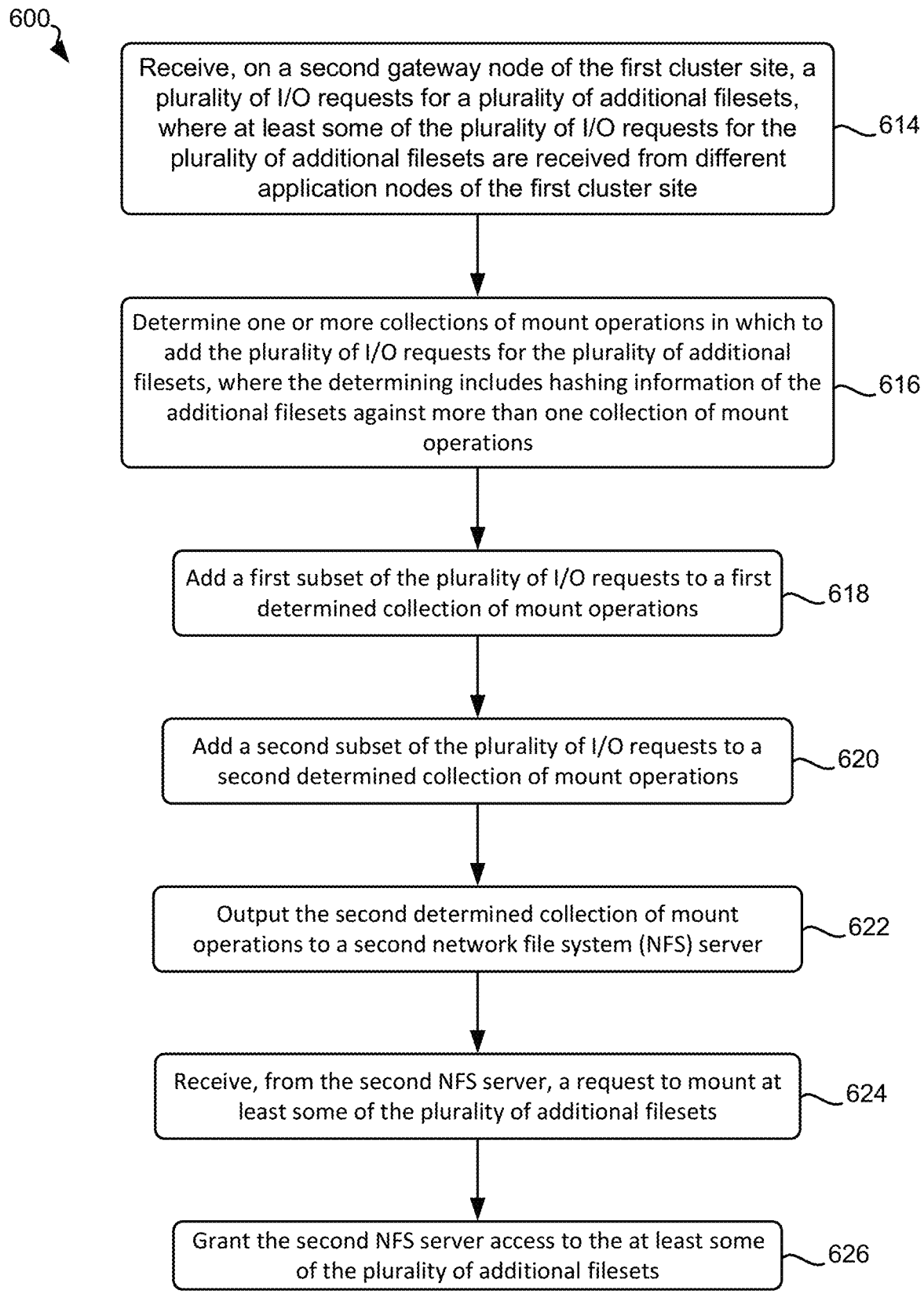
FIG. 6B is a flowchart having optional operations for the method of the flowchart of FIG. 6A.

Now referring to FIG. 6A-6B, a flowchart of a method 600 is shown according to one embodiment. The method 600 may be performed in accordance with the present invention in any of the environments depicted in FIGS. 1-3 and 7, among others, in various embodiments. Of course, more or fewer operations than those specifically described in FIG. 6A-6B may be included in method 600, as would be understood by one of skill in the art upon reading the present descriptions.

Each of the steps of the method 600 may be performed by any suitable component of the operating environment. For example, in various embodiments, the method 600 may be partially or entirely performed by a controller, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that various techniques of method 600 and/or various other embodiments/approaches described herein are contrary to typical caching/DR solutions. Generally, this is because each of the I/O requests for a fileset of interest, e.g., filesets on which data that is used for DR/backup/migration is stored, are captured by a single node of a cluster, where the single node is designated as a gateway node. This single node is typically the only node that has access to an export over a network file system to a remote/cloud cluster at which replication/DR is to occur, e.g., see FIGS. 4-5. However, as described elsewhere herein, these conventional caching/DR solutions are associated with inefficient overhead. As will not be described below, this is not the case when using various embodiments and approaches herein.

Referring now to FIG. 6A, operation 602 of method 600 includes receiving, on a first gateway node of a first cluster site, an I/O request for a first fileset. It should be noted that various filesets described herein, such as those described in approaches of FIGS. 6-7, may apply to any type of file system. According to one specific approach, such filesets may be filesets of a filesystem using IBM® SPECTRUM® STORAGE. The first cluster site may, according to various approaches, be any type of primary cluster site, e.g., a local cluster site, a cache cluster site, a production cluster site, etc. Furthermore, the first cluster site may be a portion of a clustered file system environment. For example, in the current embodiment, the clustered file system environment that includes the first cluster site may additionally include a second cluster site. The second cluster site (at which data corresponding to the I/O requests will eventually be backed up) may, according to various approaches, be any type of cluster site, e.g., a remote cluster, a DR site cluster, a home cluster, a cluster used as a migration/backup destination, etc.

Depending on the approach, the I/O request for the first fileset may be received from any one or more sources. For example, in one approach, the I/O request for the first fileset is received by the first gateway from an application node of the first cluster site. The I/O request for the first fileset may be received from the application node as a part of updating of a current state of the first fileset, e.g., in response to a data write being performed on the first fileset of an underlying filesystem (via an application node), in response to DR data configurations being modified, etc. Accordingly, the I/O request for the first fileset may in one approach include a request to update one or more copies of the data that has been modified, throughout the clustered file system environment. More specifically, in one approach, the I/O request for the first fileset may include a request to replicate an extent of data of the first cluster site to another cluster site of the clustered file system environment, e.g., the second cluster site.

Operation 604 of method 600 includes determining a collection of mount operations in which to add the I/O request for the first fileset. The determining, according to several approaches, may include hashing information of the first fileset against more than one collection of mount operations. The hashing of information of the first fileset against more than one collection of mount operations may, in some approaches, be performed using a known type of fileset information. For example, in some approaches, the information of the first fileset may include an inode of an entity, e.g., such as a file, a directory, a subdirectory, etc., that is mounted during fulfillment of the I/O request for the first fileset.

In another approach, determining a collection of mount operations in which to add the I/O request for the first fileset may include hashing information of the first fileset against one or more mount operations mount operations that are capable of being performed between the first gateway and one or more of the NFS servers. In such an approach, an inode number of the I/O request for the first fileset may be additionally and/or alternatively hashed against the potential mount operations.

For context, in some preferred approaches, determining a collection of mount operations in which to add I/O request(s) for one or more filesets ensures that operations of the first determined collection of mount operations are capable of being performed using a single mount operation, e.g., based on the files accessed in such operations being within the same file/directory/entity. Accordingly, method 600 may include ensuring that a majority of and preferably all of the I/O operations of the first determined collection of mount operations are capable of being performed using a single mount operation, e.g., based on the files accessed in such operations being within the same file/directory/entity. In some approaches, this may be achieved by selectively adding only I/O requests for filesets that are accessible in a single mount operation, to the same collection of mount operations. As will be described elsewhere herein, this is beneficial to efficiency within the clustered file system environment, because I/O requests that are capable of being fulfilled in a common mount operation are aggregated in a common collection of mount operations. This aggregation ensures that relatively less processing resources are consumed and/or overhead is created than would otherwise be consumed/created in fulfilling such I/O requests in a plurality of different mount operations.

In some approaches, each fileset may have a predetermined target to which the fileset points to. Such targets may dictate/indicate which one or more of NFS servers of a second cluster is to be targeted by the fileset. For example, in some approaches, such targets may indicate an output destination for a respective collection of mount operations. According to a more specific approach, for a single NFS server, a target may mention the NFS server name directly. Moreover, according to an approach in which the fileset/file system is to replicate to multiple NFS servers of a second cluster, method 600 may include defining a mapping to enable outputting to be performed to such clusters. For purposes of a non-limiting example, the mapping name of such a mapping may include: "mapping name: map1" and "export server map: GatewayNode1/NFSServer1, GatewayNode2/NFSServer2, GatewayNode3/NFSServer3." In such an example, the AFM fileset is configured to target the specified mapping instead of the single NFS server.

The I/O request for the first fileset may be added to a first determined collection of mount operations, e.g., see operation 606 of method 600. It should be noted that the first determined collection of mount operations is not necessarily the first temporally determined collection of mount operations. For example, in some approaches, the first determined collection of mount operations is preferably the collection of mount operations that the I/O request for the first fileset hashes to.

In some approaches the I/O request for the first fileset may be the only I/O request in the first determined collection of mount operations upon being added thereto. Alternatively, in another approach, the I/O request for the first fileset may be one of at least one other I/O request in the first determined collection of mount operations upon being added thereto.

Any collection of mount operations may have a predetermined minimum and/or maximum capacity of I/O requests that may be added thereto. For example, in some approaches, outputting a collection of mount operations, such as the first determined collection of mount operations, may be dependent on a number of I/O requests added to the first determined collection of mount operations exceeding a predetermined threshold. According to some other approaches, outputting a collection of mount operations, such as the first determined collection of mount operations, may be dependent on a predetermined amount of time elapsing since a most previous outputting of a collection of mount operations. In one or more of such approaches, in response to a predetermined amount of time elapsing since a most previous outputting of a collection of mount operations, a collection of mount operations may be output, provided that the collection of mount operations includes at least a predetermined number of I/O requests.

As noted in operation 608 of method 600, in one approach, the first determined collection of mount operations may be output to a first NFS server, e.g., output from a queue of the first gateway to a node of the first NFS server using a preexisting mapping existing between the first gateway and the first NFS server. The first NFS server may preferably be one of a plurality of NFS servers of a second cluster site. Moreover, depending on the approach, the first NFS server and at least one other NFS server of the plurality of NFS servers may be configured to receive a collection of mount operations from the first gateway node. However, the number of NFS servers that are configured to receive a collection of mount operations from a given gateway node may depend on the approach. For example, in some approaches, each of the gateway nodes of the first cluster may be configured to output collection(s) of mount operations to a different number of NFS servers. In another approach, one or more of the gateway nodes of the first cluster, and preferably each of the gateway nodes of the first cluster, may have a unique NFS server that only the respective gateway node may output to.

Having multiple NFS servers of a second cluster site configured to receive a collection of mount operations from the first gateway node, streamlines efficiency during fulfillment of the first determined collection of mount operations. This is because, the inefficiencies such as those experienced in the clustered file system environment configurations of FIGS. 4-5 as a result of gateway node(s) being configured to output to only a single NFS server, are not experienced in the clustered file system environment of the current embodiment. This is because, utilizing method 600, collections of mount operations may be output from one or more gateway nodes of the first cluster to a plurality of NFS servers of the second cluster site.

Subsequent outputting the first determined collection of mount operations to the first NFS server, a request to mount at least the first fileset may be received from the first NFS server, e.g., see operation 610 of method 600. The request to mount at least the first fileset may correspond to an attempt, by the NFS server, to fulfill the first I/O request and/or any other I/O request of the first determined collection of mount operations.

In an alternate approach, a mount operation of a collection of mount operations may be initiated by a gateway server to an export provided by an NFS server that is to receive data to at least in part enable fulfillment one or more I/O requests of the collection of mount operations.

Operation 612 of method 600 includes granting the first NFS server access to the first fileset. Thereafter, in some approaches, the first NFS server may pull data of the first fileset and/or the first gateway node may output data of the first I/O request, to the second cluster through the first NFS server. It should be noted that although operations 610, 612 above describe fulfilling the first I/O request based on the request for mounting at least the first fileset being granted, in some other approaches, fulfilling the first I/O request may include one or more additional and/or alternative techniques. For example, according to a more specific approach, method 600 may optionally additionally and/or alternatively include the first gateway node "pushing" data of the first fileset to the first NFS server, e.g., pushing replication data from the first cluster site to the second cluster site. Such an approach may allow an application to continue production at the second cluster site, even if the first cluster site becomes non-functional. According to another specific approach, method 600 may optionally additionally and/or alternatively include the first NFS server "pulling" data of the first fileset from the first gateway node, e.g., pulling replication data from the first cluster site to the second cluster site that is assigned to serve a subset of data of the first fileset. The "push" approach is particularly useful to back up data to a remote cluster such as a DR site, while the "pull" approach is particularly useful within migration scenarios, e.g., such as a scenario in which the user/customer wants to transition from using a relatively older storage cluster to using relatively newer storage clusters.

Figure 7:
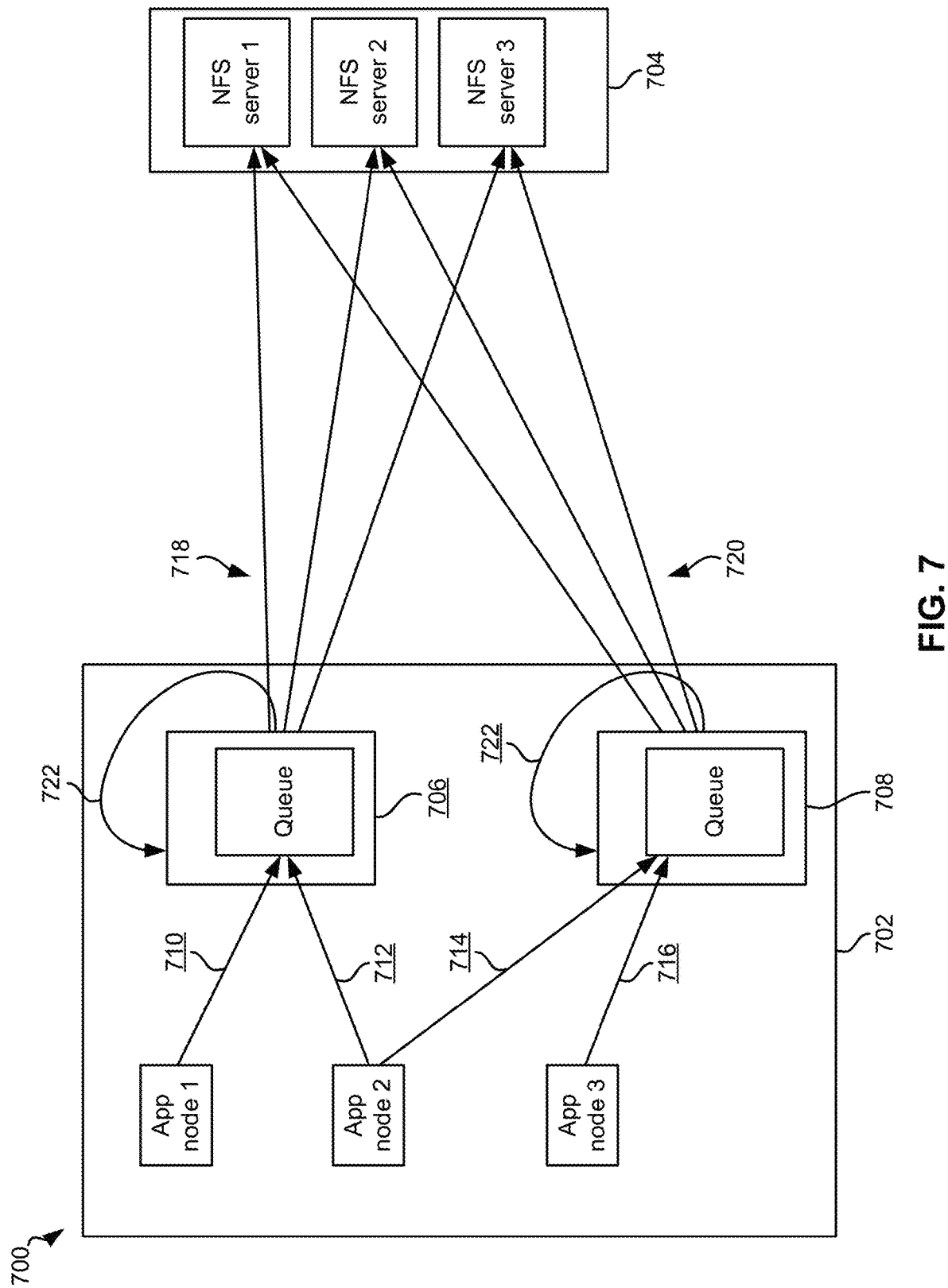
FIG. 7 is a clustered file system environment, in accordance with one embodiment.

When comparing various embodiments and approaches described herein, e.g., such as the clustered file system environment described in method 600 and/or the clustered file system environment of FIG. 7, with the clustered file system environments of FIGS. 4-5, it should be noted that having a plurality of NFS servers configured to receive a collection of mount operations from the same gateway node, has heretofore not been utilized in conventional clustered file system environments. Accordingly, various embodiments and approaches disclosed herein proceed contrary to conventional wisdom. This is at least in part because several of the embodiments and approaches described herein, e.g., such as those of FIGS. 6-7, include a one to many mapping between a single metadata server (primary) gateway node for a requested fileset, and multiple NFS server nodes in a remote cluster trying to receive/send an I/O request from a gateway node queue. Accordingly, upon playing the operations accumulated in the first gateway node, the first gateway node may optionally be used to replicate/back up an operation from a cache/the first gateway node to the first NFS server via multiple mounts made from the second cluster to the first cluster.

Although various descriptions herein describe the first cluster of the clustered file system environment of method 600 to include a first gateway node, referring now to various operations of FIG. 6B, in some approaches, the first cluster may optionally additionally include any number of additional gateway nodes, e.g., such as a second gateway node. For example, operation 614 of method 600 includes receiving, on a second gateway node of the first cluster site, a plurality of I/O requests for a plurality of additional filesets. It should be noted that operation 614 of method 600 includes the second gateway node of the first cluster site receiving a plurality of I/O requests for a plurality of additional filesets, for illustrative purposes only. In other words, according to other approaches, method 600 may include the second gateway node of the first cluster site receiving, e.g., a single I/O request for an additional fileset, no I/O requests, etc.

With continued reference to operation 614 of method 600, in one approach, at least some of the plurality of I/O requests for a plurality of additional filesets may be received from different application nodes of the first cluster site. In some approaches, the different application nodes of the cluster site may be of the same type. However, in other approaches, the different application nodes may be of a different type. According to various approaches, applications of a different type may have, e.g., different administrators managing the different application nodes, different applications, different names, etc.

In one approach, at least one of the plurality of I/O requests for the plurality of additional filesets may be received from the application node from which the first gateway node receives the first I/O request from.

Operation 616 of method 600 includes determining one or more collections of mount operations in which to add the plurality of I/O requests for the plurality of additional filesets. Depending on the approach, determining the one or more collections of mount operations in which to add the plurality of I/O requests for the plurality of additional filesets may be performed using similar techniques to those described elsewhere herein for operation 604 of method 600. For example, in some approaches, determining the one or more collections of mount operations in which to add the plurality of I/O requests for the plurality of additional filesets may include hashing information of the additional filesets against more than one collection of mount operations.

In some approaches, a first subset of the plurality of I/O requests may be added to the first determined collection of mount operations, e.g., see operation 618 of method 600. For context, the first subset of the plurality of I/O requests includes at least some, and potentially all of the plurality of I/O requests. However, it should be recalled that, according to some approaches, at least a majority of and preferably all operations of a given collection of mount operations may be capable of being performed using a single mount operation. This is because the sorting of I/O requests into a collection of mount operations having a common mount improves performance of the clustered file system environment in that the overhead that would otherwise be created in performing a plurality of independent mount operations to fulfill the I/O requests of a collection of mount operations, is avoided.

A second subset of the plurality of I/O requests may be, in some approaches, additionally and/or alternatively added to a second determined collection of mount operations, e.g., see operation 620 of method 600. In some approaches, the first subset of the plurality of I/O requests may include one or more I/O requests that are also included in the second subset of the plurality of I/O requests. In contrast, in some other approaches, the first subset of the plurality of I/O requests may include no I/O requests that are included in the second subset of the plurality of I/O requests. In yet some other approaches, the first subset of the plurality of I/O requests may include one or more mount operations that are also included in the second subset of the plurality of I/O requests.

Operation 622 of method 600 includes outputting the second determined collection of mount operations to a second NFS server. In some approaches, the second NFS server may be, at least in part, utilized to mount the filesets corresponding to the I/O requests added to the second determined collection of mount operations in order to fulfill the I/O requests added to the second determined collection of mount operations.

According to some approaches, the second NFS server is one, of a plurality of NFS servers of the second cluster site. In one approach, the plurality of servers that includes the second NFS server may be the same plurality of NFS servers that includes the first NFS server. The second NFS server and at least one other NFS server of the plurality of NFS servers may be configured to receive a collection of mount operations from the second gateway node, e.g., output from a queue of the second gateway to a node of the second NFS server using a preexisting mapping existing between the second gateway and the second NFS server. Having multiple NFS servers of a second cluster site configured to receive a collection of mount operations from the second gateway node, streamlines efficiency of fulfilling the second determined collection of mount operations. This is because, the lack of outputting avenues that may be experienced in the clustered file system environment configurations of FIGS. 4-5 as a result of the gateway nodes being configured to output to only a single NFS server, are not experienced in the current embodiment. This benefit is enabled as a result of having a plurality of NFS servers at the second cluster site configured to receive a collection of mount operations from the second gateway node.

In some approaches, at least some of the plurality of NFS servers may be configured to receive requests from at least both the first gateway node and the second gateway node. Moreover, depending on the approach, at least some of the NFS servers may be configured to receive requests from only the first gateway node or only the second gateway node.

The I/O request received on the first gateway node may, according to some approaches, not be processed by the second gateway node. Similarly, the plurality of I/O requests received on the second gateway node may, in some approaches, not be processed by the first gateway node. These approaches distinguish the benefit of having a plurality of NFS servers of the second cluster site, configured to receive a collection of mount operations from a gateway node of the first cluster site. This includes a preservation of processing resources which results from an NFS server that receives a collection of mount operations not having to use processing resources to allocate one or more of such mount operations to other NFS servers, as such NFS server may already be configured to receive such the collection from the first cluster site.

In some approaches, method 600 may optionally include ensuring that a threshold amount of I/O requests for the first determined collection of mount operations and a threshold amount of I/O requests for the second determined collection of mount operations are configured such that an amount of resources of the first cluster site anticipated to be consumed in performing the first determined collection of mount operations is about equal to an amount of resources of the first cluster site anticipated to be consumed in performing the second determined collection of mount operations. One or more of such approaches may be at least in part based on an estimating, e.g., using known techniques, of an amount of resources of the first cluster site anticipated to be consumed in performing the first determined collection of mount operations, and/or an estimating, e.g., using known techniques, of an amount of resources of the first cluster site anticipated to be consumed in performing the second determined collection of mount operations. For context, the term "is about equal" may depend on the approach. For example, according to several approaches, the term may be defined as, e.g., within one tenth of the amount of I/O resources used during the other collection of mount operations, within one one-hundredth of the amount of I/O resources used during the other collection of mount operations, within one one-thousandth of the amount of I/O resources used during the other collection of mount operations, etc.

Operation 624 of method 600 includes receiving, from the second NFS server, a request to mount at least some of the plurality of additional filesets.

Access to the at least some of the plurality of additional filesets may be granted to the second NFS server, such as in response to receiving the request of operation 624, e.g., see operation 626 of method 600.

FIG. 7 depicts a clustered file system environment 700, in accordance with one embodiment. As an option, the present clustered file system environment 700 may be implemented in conjunction with features from any other embodiment listed herein, such as those described with reference to the other FIGS. Of course, however, such clustered file system environment 700 and others presented herein may be used in various applications and/or in permutations which may or may not be specifically described in the illustrative embodiments listed herein. Further, the clustered file system environment 700 presented herein may be used in any desired environment.

The clustered file system environment 700 includes a first cluster 702 and a second cluster 704. In the current approach, the first cluster 702 includes at a first gateway node 706 and a second gateway node 708, either and/or both of which may, depending on the approach, be designated as a metadata server. The first cluster 702 includes a plurality of application nodes, e.g., see App node 1-App node 3. Moreover, the second cluster 704 includes a plurality of NFS servers, e.g., see NFS server 1, NFS server 2, NFS server 3.

In the current configuration of the clustered file system environment 700 the first gateway node 706 is configured to receive I/O requests for filesets, e.g., see a first I/O request 710 for a first fileset received by the first gateway node 706 from App node 1 and a second I/O request 712 for the first fileset received by the first gateway node 706 from App node 2. Similarly, the second gateway node 708 is configured to receive I/O requests for filesets, e.g., see a first I/O request 714 for a second fileset received by the second gateway node 708 from App node 2 and a second I/O request 716 for the second fileset received by the second gateway node 708 from App node 3. Accordingly, it should be noted that I/O requests for a common fileset are preferably received on a common gateway node, even when such I/O requests for a common fileset are requests are received from different application nodes.

Although in some approaches, an I/O request received by a gateway node from an application node may be processed and/or output by the receiving gateway node, in some other approaches, another gateway node may be utilized to process and/or output the I/O request. In some approaches, it may be determined whether to split a received I/O request across more than one of the gateway nodes of a cluster. For example, in one approach, a portion of an I/O request received by the first gateway node 706, may be split across both the first gateway node 706 and the second gateway node 708 in response to a determination that the I/O request exceeds a predetermined threshold size, e.g., one gigabyte, ten gigabytes, one hundred gigabytes, etc. The split portions of the I/O request may thereafter be output to one or more NFS servers by the processing gateway node(s), e.g., the gateway node that determines a collection of mount operations in which to add the portion of the I/O request.

A collection of mount operations in which to add the I/O requests for the first fileset may be determined. The I/O requests for the first fileset may be added to the determined collection of mount operations. Similarly, a collection of mount operations in which to add the I/O requests for the second fileset may be determined. The I/O requests for the second fileset may be added to the determined collection of mount operations. In some approaches, all I/O of the I/O requests is preferably equally distributed across the collection of mount operations that are output to NFS servers of the second cluster 704. However, it should be noted that in the clustered file system environment 700, the NFS server to which a gateway node of the first cluster 702 outputs a collection of mount operations to, may be one of a plurality of NFS servers of the second cluster 704 configured to receive the collection of mount operations from the gateway node performing the outputting operation. For example, as illustrated in FIG. 7, in the current embodiment, each of NFS servers 1-3 are configured to receive a collection of mount operations from the first gateway node 706, e.g., see arrows 718. Similarly, each of NFS servers 1-3 are, in the current embodiment, configured to receive a collection of mount operations from the second gateway node 708, e.g., see arrows 720.

In some approaches, failures, e.g., such as ACK failures, experienced by either of the gateway nodes 706, 708 are not output to another of the gateway nodes, e.g., as illustrated by the loopback arrows 722. More specifically, in the current approach, in response to experiencing an error within a given one of the gateway nodes 706, 708, protocol calls may not be made to the other one of the gateway nodes 706, 708.

Several benefits enabled by utilizing the one to many mapping between the first gateway node 706 for the first fileset and the multiple NFS server nodes (NFS servers 1-3) in the second cluster 704 trying to receive/send the IO request from the Gateway node queue will now be detailed below. It should be noted that similar benefits are also enabled as a result of the clustered file system environment 700 including the second gateway node 708 which may be additionally and/or alternatively configured to output a collection of mount operations to one or more of the plurality of NFS servers 1-3. For example, utilizing the clustered file system environment 700, in order to play the operations accumulated in a single gateway node such as the first gateway node 706, an operation may optionally be replicated/backed-up from the gateway node/cache of the gateway node to the remote second cluster 704 via multiple mounts made from the second cluster 704 over to the local owning cluster, e.g., the first cluster 702 in the present example. As previously mentioned, this is contrary to conventional configurations which split the I/O of a single file into chunks among multiple gateways, each of which thereafter mount the export served from multiple NFS server nodes. In contrast, in one approach of the current embodiment, the primary gateway node serving the cluster and fileset of a given I/O request, it configured to perform mounts from multiple NFS servers.

In some approaches, every gateway node (including a metadata server gateway) associated with the fileset/file system may mount all associated NFS server exports for the given fileset in order to be ready for I/O replication for the given fileset/file system. As a result of doing so, replication of all data and metadata operations that are performed on the fileset, is performed in a parallel manner.

In some approaches, the clustered file system environment 700 preferably maintains queue processing completely within the metadata server gateway for the fileset. This and/or the use of multiple NFS servers may ease the bottlenecking that might otherwise be experienced by outputting to only a single NFS server model, e.g., see FIG. 4. In some approaches, a primary metadata server gateway node of a fileset of the first cluster 702 may be utilized to consolidate the number of operations that are queued to be played to the second cluster 704 at any point in time by ensuring that whatever is stored in the queue at a given point in time is only those operations that are required/scheduled, e.g., based user data settings, to be replicated back to the remote/cloud site. More specifically this may be achieved by filtering out operations in the queue that are not required/scheduled, e.g., based user data settings, to be played to the remote/cloud site anymore. For purposes of a non-limiting example, a sequence of operations that the application node may output to the gateway node is as follows:

1) Create a file
2) Chmod on the file
3) Write data to the file Sequence 1
4) Truncate the file
5) Remove the file With continued reference to FIG. 7, regarding write class operations (from the owning cluster to the remote site), in some approaches, upon a request being requested/scheduled to be played from an owning server to a remote side, a local inode number of the entity on which the request is to be played may be hashed against the number of buckets of mounts, e.g., collections of mount operations, that have been created/currently exist. Depending on the approach, there may exist any number of buckets at a time that hashing is performed, although in some approaches, the number of buckets may not exceed a maximum threshold of buckets, e.g., twenty buckets, thirty buckets, one hundred buckets, etc. Whichever bucket the request hashes to, the operation(s) may be carried out on the NFS server mount. By keeping all requests from the same file/directory/entity on the same NFS mount, multiple read/writes are avoided from occurring on a disk on the remote site. Note that these avoided read/writes might otherwise occur within approaches in which different operations corresponding to a common file/directory/entity are output to different NFS servers.

Similar benefits extend into read class operations as well, particularly for approaches that involve bulk operations such as migration cases. This is because when all files/directories/entities from a remote site are to be moved over to a local owning cluster file system, conventional approaches such as those shown in FIGS. 4-5 are currently limited by the amount of parallelism that can be achieved from a gateway node of a local cluster and a NFS server node of a remote cluster. In sharp contrast, various embodiments and approaches described herein, such as those pertaining to method 600 and/or the clustered file system environment 700, are able to, in a multithreaded fashion, move all data from a remote site on to a local cluster using potentially all available NFS server nodes. This increases the bandwidth available between the two clusters, which is beneficial to system performance. In some approaches, this is enabled by splitting requests in a queue of a gateway node to the multiple mounts, and more specifically by additionally and/or alternatively ensuring that all operations pertaining to a particular inode are scheduled on the same mount, e.g., see operations 604-606 of method 600. Ensuring that all operations pertaining to a particular inode are scheduled on the same mount is important from an efficiency standpoint, because having a plurality of NFS servers requesting input/output operations per second (TOPS) on a common inode at the remote site may otherwise introduce a small amount of lag in each node having to cache the metadata of the inode in consideration, e.g., thereby creating contentions between NFS server nodes of the same inode.

In contrast, if some, if not all, operations from a particular inode are redirected to the same NFS server mount, the caching employed by the single NFS server serving the inode of interest may leverage and flush out a maximum TOPS on the inode while just caching the metadata of the inode of interest a single time on to the NFS server. This is further aided in that multiple read/write requests on a single inode may be coalesced into a single request at the gateway node. In some approaches, this may be achieved by identifying existing read/write requests on the inode, and merging such offset and length of the requests. Such approaches further assist redirecting inodes to NFS mounts that will result in the greatest relative amount of efficiency (through hashing the inode against the number of working NFS mounts that exist).

In some approaches, a write/read operation of small files may be performed by sending the whole file write/read as a single chunk, from the first gateway node 706 to the second gateway node 708 (and/or vice versa), where thereafter it may be performed on an NFS mount to which it will eventually be hashed. According to one alternative approach, a write/read operation of small files may be hashed to the unique mount within a primary gateway server itself that is to be pushed/pulled.

The benefits offered by various embodiments and approaches described herein also apply to failure handling. For example, in some approaches, where an NFS server of a remote cluster, e.g., such as the second cluster 704, fails, a status may be maintained on each server mount to determine if a given server is functional or non-functional. Such status(es) may be used in order to prevent relatively newer generated requests from using servers determined to be non-functional.

A reverse of identifying a non-functional server returning to be functional is also simple. For example, in one approach, after maintaining a timeout during which, for a predetermined amount of time, requests are not attempted to be sent to a server that is determined to be non-functional, a single request may be output to the server previously determined to be non-functional, in order to determine if the server can continue replicating the request to the remote site. In response to the request being successfully received, an indicator may be stored that indicates that the server has been determined to be functional, thereby allowing future requests to be output to the restored server. However, in response to determining that the test request fails, the server may continue to be determined to be non-functional. In one approach it may be again determined whether the server has restored functionality after a predetermined amount of time elapses and/or an event is detected, e.g., after a stale check timeout has turned on the previously non-functional cluster.

A primary metadata gateway node, e.g., such as the first gateway node 706, may continue to replicate provided that at least one of the NFS servers is responding. Accordingly, in some approaches, a primary gateway may be utilized to keep track of non-functioning mounts of NFS servers, and periodically ping such servers in order to determine if non-functional server(s) have regained functionality. In response to determining that an NFS server has regained functionality, the revived NFS server may be used in order to leverage more parallelism to play through requests. It should be noted that, even if a non-functional NFS server fails to regain functionality, the configuration of embodiments and approaches described herein, such as that of the clustered file system environment 700, is still relatively more efficient than the conventional configurations of FIGS. 4-5, as such conventional configurations typically halt all replication until a non-functional NFS server, that is targeted by a metadata server, regains functionality.

Because in some preferred approaches there is exactly one mount of each NFS server node on the metadata server gateway itself, there may be an equal load output to almost all the NFS servers. When compared with conventional configurations that experience the overloading of an NFS server based on all outputs of a gateway server node having a single NFS server as a target, e.g., see FIGS. 4-5, benefits of various embodiments and approaches described herein are furthermore apparent. For example, instances of multiple helper gateway nodes attempting to bombard a helper gateway node with parallel read/write chunk requests are avoided in the clustered file system environment 700.

In some approaches, performance gain of a clustered file system environment may be greatly improved as a result of combining techniques described herein for splitting large file I/O across multiple helper gateway nodes in the cluster, and keeping small file I/O and metadata on files sent from a single metadata server gateway node. This because data intensive operations may be offloaded to be performed on multiple helper nodes to thereby achieve parallel file system fetching/writing of data to disk in parallel. Moreover, this is because other operations such as, e.g., metadata intensive operations, small file I/O replication operations, caching, etc., may be performed from single Gateway to multiple NFS servers, which enables overall replication performance.

In summary, various embodiments and approaches described herein enable at least the following benefits to throughput/efficiency in clustered file system environments. First, such documents and approaches enable parallelized replication/fetching of all data (irrespective or small/large I/O chunks) and metadata operations across NFS server nodes of a cluster (data serving/receiving nodes in a remote/cloud cluster). Moreover, replication/fetching of relatively small files is fully parallelized among multiple NFS server nodes. This may be achieved using a primary metadata server gateway alone and/or additionally utilizing help from a helper gateway node, such as the second gateway node 708 of the clustered file system environment 700.

Conventional clustered file system bottlenecking is also avoided from a single NFS server node that is bombarded with I/O (small files IO and metadata) requests from a primary gateway server node (metadata server). In a considerable number of instances, an NFS server of such conventional clustered file systems may have a limited number of remote procedure call (RPC) handlers, and if the handlers are exhausted, e.g., the resources of the handlers are maxed out, a requester may be forced to wait until the handlers are freed up. In sharp contrast, as described herein, as a result of employing multiple NFS servers, the number of parallel threads that may attempt to flush I/O from a gateway node may be instantly doubled (at the least), and even tripled for clustered file system environments utilizing SPECTRUM® Scale by IBM® (which may be purchased from IBM North America, 590 Madison Avenue, New York, N.Y. 10022, United States).

Third, a one to many mapping may be created between a primary gateway node to multiple available NFS servers, whether or not the NFS serving clusters have load balancers. Furthermore, various embodiments and approaches described herein enable load balancing based on operations on a single inode to one of multiple NFS server mounts being taken, as compared to conventionally utilizing a round-robin type distribution of all mounts made on a specific IP address, which is done in conventional NFS load balancers. Here, in sharp contrast, there is a static mapping of gateway nodes and which set of NFS servers to use, and hence more control of which NFS servers are to be used is available to a user/administrator of a clustered file system.

Yet furthermore, relatively better throughput (as compared to the throughput of conventional clustered file systems) from a serving file system of remote/cloud cluster is achieved. For example, in an illustrative approach in which the file system is a distributed file system, relatively greater performance is achieved by performing I/O to the distributed file system using multiple NFS serving nodes. Note that in contrast, a single NFS server undertaking an entirety of I/O does not leverage the capacity of an underlying distributed parallel file system.

There is also relatively less instances of RPC "ping pong" that occurs between primary cluster nodes (gateway designated ones). It may be recalled that for configurations in which multiple helper gateway nodes are responsible for coordinating the sending/receiving of big file data from/to a remote/cloud cluster, the RPC overhead between the primary gateway and a helper gateway nodes sometimes can become complicated to an extent that ultimately defeats any performance achieved in splitting the I/O between multiple gateway nodes in the cluster. This is not the case in various embodiments and approaches described herein, as cluster nodes of some of such embodiments and approaches utilize nodes that may each be configured to receive I/O requests from application nodes, and moreover may each be configured to output I/O request operations to a plurality of NFS servers.

Various embodiments and approaches described herein moreover enable replication across a plurality of clusters in a clustered file system environment even where only a single NFS server remains functional. Also, failure handling in case of one non-functional NFS server among many going bad involves just trying a request on the respective mount and marking functionality status, e.g., bad/good. This is relatively more efficient than sending a costlier RPC to helper gateway nodes to detect and realize failures, as well as to determine whether a failure has been fixed (thereby allowing the remote/cloud end to again respond.

Parallelism is also maintained within the same primary gateway node, where it can throttle the number of threads required according to response speeds of the NFS server. This eliminates having to instead send RPC across gateway nodes to throttle the same.

In some approaches, an application I/O path may be made available based on certain sync operations being performed. These sync operations may depend on a one or more asynchronous operations in a queue of a primary gateway node. If such dependent operations are requested/scheduled to be played, and NFS latency prevents such operations from being played, conventional approaches do not currently include alternate channels configured to retry the dependent request to achieve a faster completion time. In sharp contrast, utilizing various embodiments and/or approaches described herein, in response to a primary gateway node detecting a latency in playing through a dependent operation on one of the NFS server mounts, the operation may be terminated and immediately redirected to a different NFS server mount. This achieves efficient performance (or at least relatively better performance) on the application node that may be waiting on the queueing acknowledgement.

Furthermore, various embodiments and approaches described herein may enable throughput/efficiency in a clustered file system environment by utilizing exactly one NFS mount of every export of an NFS server of a designated remote/cloud target fileset on a primary gateway (metadata server). This thereby avoids any overload on the NFS servers altogether and achieves relatively better parallelization at the primary gateway node and better serialization at the NFS servers, each of which contribute to performance improvements throughout replication/backup projects to remote/cloud sites and/or during data migration to a new scaled system.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving, on a first gateway node of a first cluster site, an input/output (I/O) request for a first fileset;
   determining a collection of mount operations in which to add the I/O request for the first fileset, wherein the determining includes hashing information of the first fileset against more than one collection of mount operations;
   adding the I/O request for the first fileset to a first determined collection of mount operations; and
   outputting the first determined collection of mount operations to a first network file system (NFS) server, wherein the first NFS server is one of a plurality of NFS servers of a second cluster site, wherein the first NFS server and at least one other NFS server of the plurality of NFS servers are configured to receive a collection of mount operations from the first gateway node.

2. The computer-implemented method of claim 1, wherein the information of the first fileset includes an inode of an entity that is mounted during fulfillment of the I/O request for the first fileset.

3. The computer-implemented method of claim 1, wherein a majority of I/O operations of the first determined collection of mount operations are capable of being performed using a single mount operation.

4. The computer-implemented method of claim 1, comprising:
   receiving, on a second gateway node of the first cluster site, a plurality of I/O requests for a plurality of additional filesets, wherein at least some of the plurality of I/O requests for the plurality of additional filesets are received from different application nodes of the first cluster site;
   determining one or more collections of mount operations in which to add the plurality of I/O requests for the plurality of additional filesets, wherein the determining includes hashing information of the additional filesets against more than one collection of mount operations;
   adding a first subset of the plurality of I/O requests to the first determined collection of mount operations;
   adding a second subset of the plurality of I/O requests to a second determined collection of mount operations; and
   outputting the second determined collection of mount operations to a second NFS server, wherein the second NFS server is one of the plurality of NFS servers of the second cluster site, wherein the second NFS server and at least one other NFS server of the plurality of NFS servers are configured to receive a collection of mount operations from the second gateway node.

5. The computer-implemented method of claim 4, wherein at least some of the plurality of NFS servers are configured to receive requests from both the first gateway node and the second gateway node.

6. The computer-implemented method of claim 4, wherein the I/O request received on the first gateway node is not processed by the second gateway node, wherein the plurality of I/O requests received on the second gateway node are not processed by the first gateway node.

7. The computer-implemented method of claim 4, wherein a threshold amount of I/O requests for the first determined collection of mount operations and a threshold amount of I/O requests for the second determined collection of mount operations are configured such that an amount of resources of the first cluster site anticipated to be consumed in performing the first determined collection of mount operations is about equal to an amount of resources of the first cluster site anticipated to be consumed in performing the second determined collection of mount operations.

8. The computer-implemented method of claim 1, wherein the first determined collection of mount operations is output to the first NFS server in response to a number of I/O requests added to the first determined collection of mount operations exceeding a predetermined threshold.

9. The computer-implemented method of claim 1, wherein the I/O request for the first fileset includes a request to replicate an extent of data of the first cluster site to the second cluster site.

10. A computer program product for data transfer between file systems of a first cluster site and a second cluster site according to collections of mount operations, to enable disaster recovery (DR)/backup/migration solutions having relatively high efficiencies/throughput, the computer program product comprising a non-transitory computer readable storage medium having program instructions embodied therewith, the program instructions readable and/or executable by a controller to cause the controller to:
   receive, by the controller, on a first gateway node of a first cluster site, an input/output (I/O) request for a first fileset;
   determine, by the controller, a collection of mount operations in which to add the I/O request for the first fileset, wherein the determining includes hashing information of the first fileset against more than one collection of mount operations;
   add, by the controller, the I/O request for the first fileset to a first determined collection of mount operations; and
   output, by the controller, the first determined collection of mount operations to a first network file system (NFS) server, wherein the first NFS server is one of a plurality of NFS servers of a second cluster site, wherein the first NFS server and at least one other NFS server of the plurality of NFS servers are configured to receive a collection of mount operations from the first gateway node.

11. The computer program product of claim 10, wherein the information of the first fileset includes an inode of an entity that is mounted during fulfillment of the I/O request for the first fileset.

12. The computer program product of claim 10, wherein a majority of I/O operations of the first determined collection of mount operations are capable of being performed using a single mount operation.

13. The computer program product of claim 10, the program instructions readable and/or executable by the controller to cause the controller to:
   receive, by the controller, on a second gateway node of the first cluster site, a plurality of I/O requests for a plurality of additional filesets, wherein at least some of the plurality of I/O requests for the plurality of additional filesets are received from different application nodes of the first cluster site;

determine, by the controller, one or more collections of mount operations in which to add the plurality of I/O requests for the plurality of additional filesets, wherein the determining includes hashing information of the additional filesets against more than one collection of mount operations;

add, by the controller, a first subset of the plurality of I/O requests to the first determined collection of mount operations;

add, by the controller, a second subset of the plurality of I/O requests to a second determined collection of mount operations; and output, by the controller, the second determined collection of mount operations to a second NFS server, wherein the second NFS server is one of the plurality of NFS servers of the second cluster site, wherein the second NFS server and at least one other NFS server of the plurality of NFS servers are configured to receive a collection of mount operations from the second gateway node.

14. The computer program product of claim 13, wherein at least some of the plurality of NFS servers are configured to receive requests from both the first gateway node and the second gateway node.

15. The computer program product of claim 13, wherein the I/O request received on the first gateway node is not processed by the second gateway node, wherein the plurality of I/O requests received on the second gateway node are not processed by the first gateway node.

16. The computer program product of claim 13, wherein a threshold amount of I/O requests for the first determined collection of mount operations and a threshold amount of I/O requests for the second determined collection of mount operations are configured such that an amount of resources of the first cluster site anticipated to be consumed in performing the first determined collection of mount operations is about equal to an amount of resources of the first cluster site anticipated to be consumed in performing the second determined collection of mount operations.

17. The computer program product of claim 10, wherein the first determined collection of mount operations is output to the first NFS server in response to a number of I/O requests added to the first determined collection of mount operations exceeding a predetermined threshold.

18. The computer program product of claim 10, wherein the I/O request for the first fileset includes a request to replicate an extent of data of the first cluster site to the second cluster site.

19. A system, comprising:

a processor; and logic integrated with the processor, executable by the processor, or integrated with and executable by the processor, the logic being configured to:

receive, on a first gateway node of a first cluster site, an input/output (I/O) request for a first fileset;

determine a collection of mount operations in which to add the I/O request for the first fileset, wherein the determining includes hashing information of the first fileset against more than one collection of mount operations;

add the I/O request for the first fileset to a first determined collection of mount operations; and output the first determined collection of mount operations to a first network file system (NFS) server, wherein the first NFS server is one of a plurality of NFS servers of a second cluster site, wherein the first NFS server and at least one other NFS server of the plurality of NFS servers are configured to receive a collection of mount operations from the first gateway node.

20. The system of claim 19, wherein the information of the first fileset includes an inode of an entity that is mounted during fulfillment of the I/O request for the first fileset.

* * * * *